May 12, 1959
R. W. WILSON
2,886,053
VALVE CONSTRUCTION
Filed Jan. 31, 1956
2 Sheets-Sheet 1
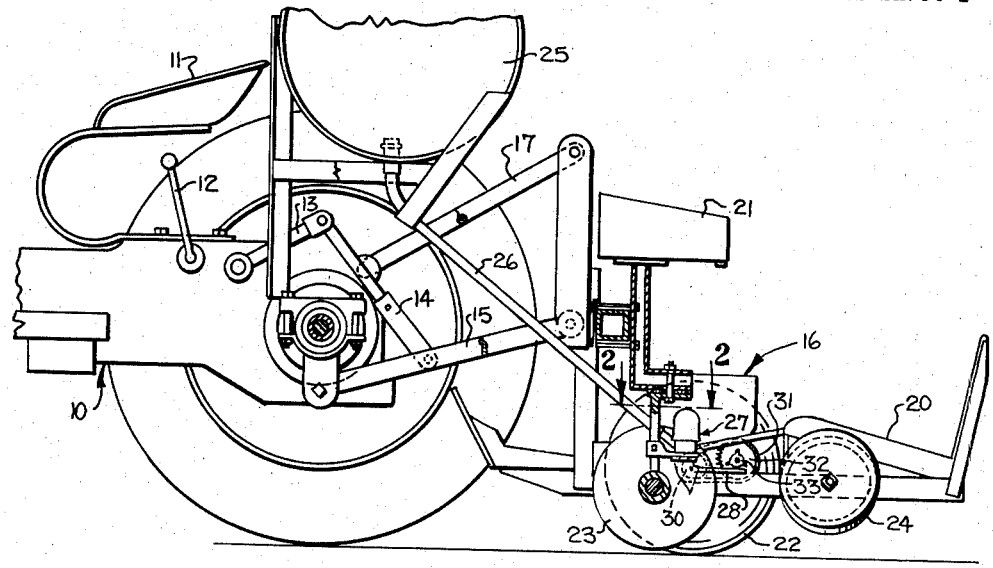
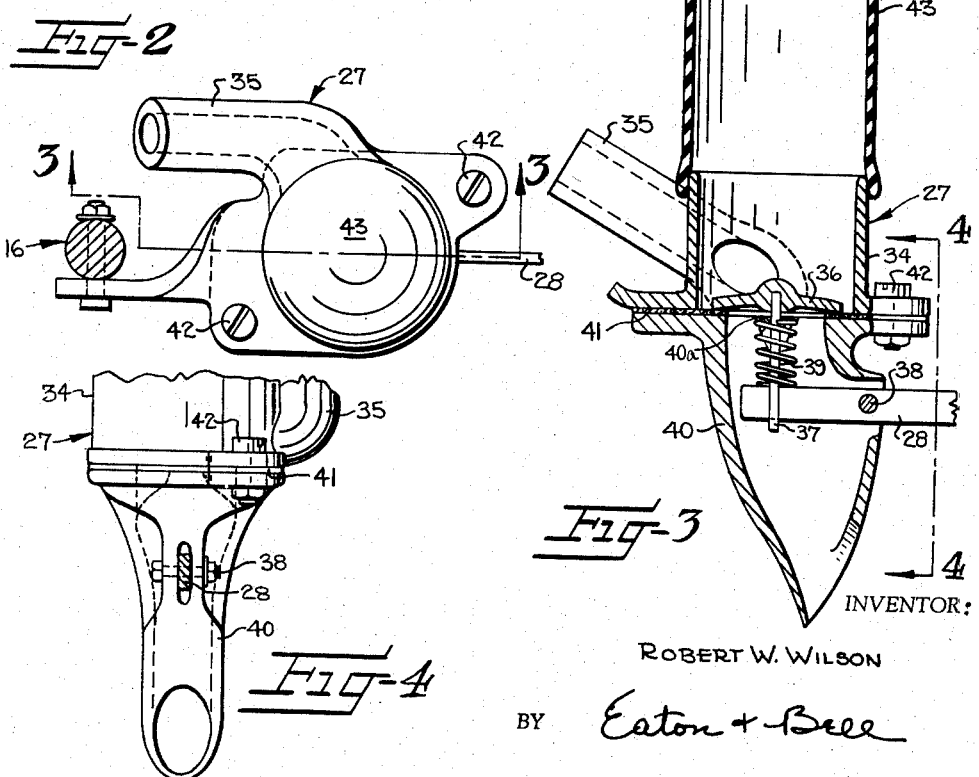
INVENTOR:
ROBERT W. WILSON
BY Eaton + Bell
ATTORNEYS

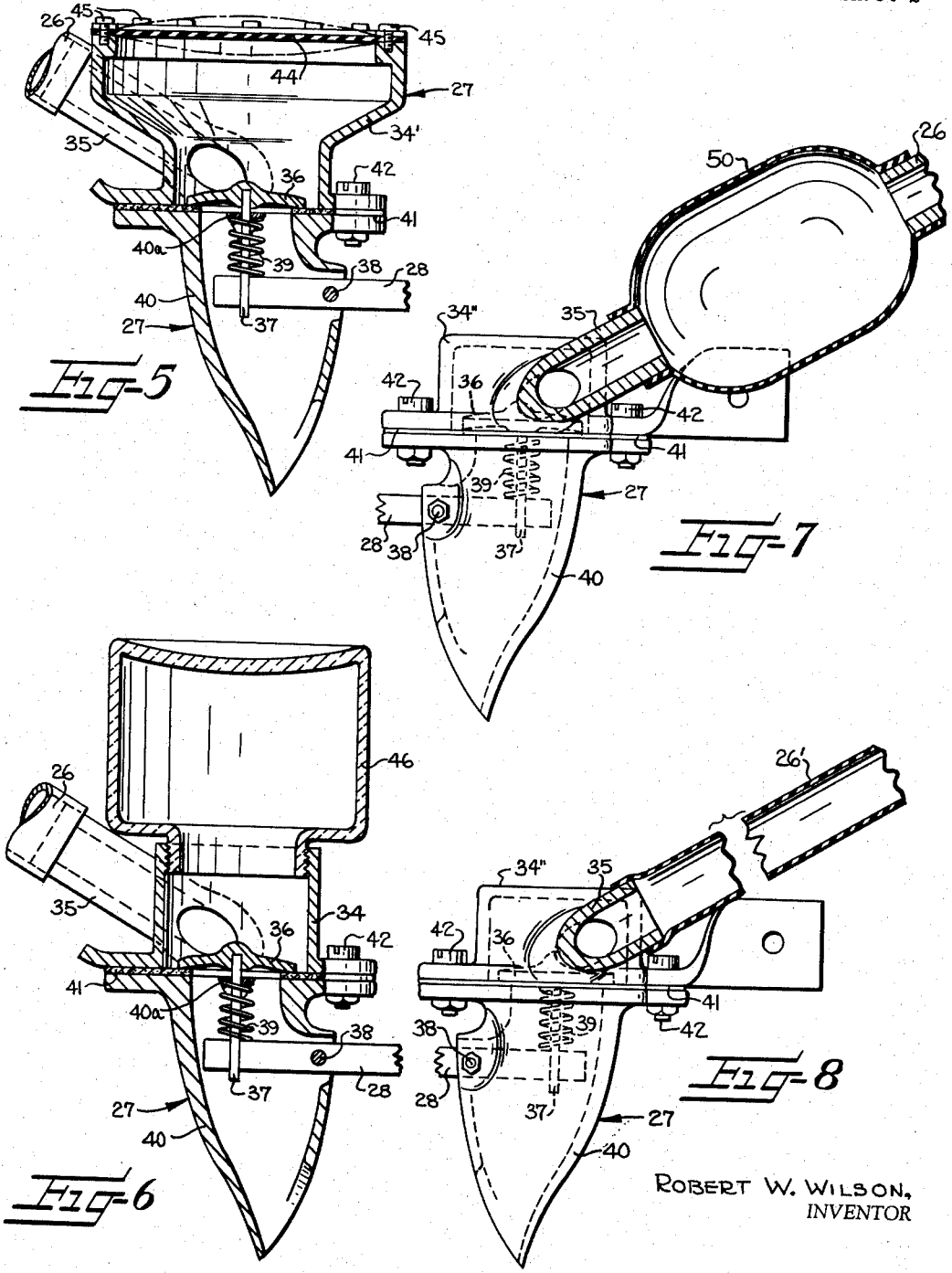

United States Patent Office 2,886,053
Patented May 12, 1959

2,886,053

VALVE CONSTRUCTION

Robert W. Wilson, Charlotte, N.C., assignor to R. H. Bouligny, Inc., Charlotte, N.C., a corporation of North Carolina Application January 31, 1956, Serial No. 562,622

11 Claims. (Cl. 137—207)

This invention relates to a valve construction and, more particularly, to a valve construction for use with transplanters wherein the valve discharges a predetermined amount of water at predetermined intervals into a furrow in which the plant being transplanted is deposited.

In the transplanting of plants as in other types of endeavor, it is highly desirable to increase the speed of operation without any loss in quality of the operation being performed. To increase the rate of transplanting plants with a transplanter, it is necessary to increase the speed of operation of the valve which discharges water into the furrows at predetermined intervals. In the present practice, the valve is usually tripped thirty to eighty times per minute to discharge a predetermined amount of water to the plants. The amount of water discharged usually varies from four to eight ounces dependent on the moisture conditions of the soil. In extra dry planting conditions, the larger amounts are discharged to insure a more uniform stand and uniform start for the plants while in damp planting, the lower amounts are discharged.

A serious problem has arisen with respect to the higher speeds of discharge in that, upon the valve closing after a discharging operation, the water surges back and the valve is again opened prior to the completion of this backward surge with the result that a lesser quantity of water is discharged to the plants being planted than is required which results in a great loss of the plants for lack of proper moisture.

Also, the construction of transplanters requires that a long column of water must be started to flow before any water is emitted from the valve. This is due to water not being compressible. In perfecting this invention, it has been discovered that during high speeds of valve operation to discharge water, that sufficient time is not allowed for the entire column of water to flow. When the valve was kept open longer periods of time to overcome the lag of the water, the water was used very inefficiently in that the water was spread over a long distance of the row instead of the same being completely discharged at the deposited plant.

It is therefore an object of this invention to provide means for dampening the backward surge or resonance of the water upon the valve being closed to insure that a predetermined amount of water is discharged with each operation of the valve.

It is also an object of this invention to provide means for dampening the backward surge of the water upon the valve being closed which permits the valve to be operated at speeds heretofore never thought attainable which results in a considerable increase in efficiency of the transplanter device and an increase in production with a resulting lowering of costs for the transplanting operation.

It is a further object of the invention to provide a supply of water adjacent the valve which is immediately available to be discharged upon the valve being opened to avoid waiting for the entire column of water to start moving. This is accomplished by having resilient means acting on the supply of water adjacent the valve to cause the water to quickly flow through the valve upon the same being opened.

Some of the objects of the invention having been stated, other objects will appear as the description proceeds when taken in connection with the accompanying drawings, in which—

Figure 1 is a fragmentary horizontal sectional view of a transplanter shown secured to the rear of a tractor for being operated by the same;

Figure 2 is a top plan view of the transplanter valve taken along the line 2—2 of Figure 1;

Figure 3 is a vertical sectional view taken along the line 3—3 of Figure 2;

Figure 4 is a fragmentary side elevation taken along line 4—4 of Figure 3;

Figure 5 is a vertical section similar to Figure 3 and showing a second embodiment of the invention;

Figure 6 is a view similar to Figure 5 and showing a third embodiment of the invention;

Figure 7 is a view similar to Figure 6 with the valve rotated 180° and showing a fourth embodiment of the invention;

Figure 8 is a view similar to Figure 7 and showing the fifth embodiment of the invention.

Referring more specifically to the drawings, and particularly Figure 1, reference numeral 10 broadly indicates the rear portion of a tractor having an operator's seat 11 and a hoist actuating lever 12 which controls movement of linkage 13, 14 and 15 for elevating a transplanter broadly indicated at 16 with respect to the surface of the earth when turning the same around at the end of a planted row or when transporting the same. A stabilizing link 17 is provided having its front end secured to the tractor 10 and its rear end secured to the front portion of the transplanter 16 for maintaining the transplanter in a predetermined path of movement when the same is being elevated.

The transplanter 16, shown for purposes of illustrating the invention, is of the type shown and described in detail in Patent No. 2,584,012. The transplanter is provided with an operator's seat 20 and a plant hopper 21 from which the plants to be planted are removed by the operator. A pair of wheels 22 are provided for supporting the transplanter while being pulled by the tractor 10. A pair of furrow-opening disks 23 and a pair of furrow-covering wheels 24 (only one of each pair is shown) are provided for opening the earth to receive the plants and for covering the same after the plant is positioned in the furrow.

A valve 27 is provided on the transplanter 16 and has a valve lever arm 28 for actuating the same to discharge a predetermined amount of water in the furrow for each plant deposited. For actuating the valve lever arm 28, a sprocket wheel 30 is secured to the shaft for the wheels 22 which sprocket wheel 30 drives an endless chain 31 which drives another sprocket wheel 32 of the same size on the shaft of which is secured a cam 33. Upon rotation of the cam 33, the valve lever arm 28 is tripped by being moved downwardly by the cam projections to discharge a predetermined amount of water. The cam 33 is shown in the form of a multiple cam having a plurality of raised portions thereon, namely three, for tripping the valve lever arm 28 three times for each revolution of the wheels 22. It is apparent that the cam 33 may have any desired number of projections thereon to correspond with the number of discharges of water desired in a given period. It is also apparent that the valve is not tripped when the transplanter 16 is elevated which moves the wheels 22 out of driving contact with the earth.

In Figures 2 to 4 is illustrated a conventional valve construction embodying the first form of the invention. The valve 27 is provided with a support or housing 34 having a hose connection or passageway 35 leading out from one side thereof to be connected to a hose or supply line 26 for receiving water therethrough from a water reservoir or tank 25. A valve plunger 36 is positioned in the housing or support 34 with its stem 37 extending downwardly through a stem guide 40a formed integral with a spout 40, with the stem having its lower end connected to the valve lever arm 28. The stem 37 is surrounded by a spring 39 having its upper end in engagement with the stem guide 40a and its lower end in engagement with the lever arm 28 for returning the valve plunger 36 to closed position after a discharging operation. It will be noted that the valve lever arm 28 is pivotally mounted at 38 adjacent one edge of the valve spout 40 which spout is connected by suitable bolts 42 to the support or housing 34. A gasket 41 is provided to seal the connection of the housing or support 34 to the spout 40.

It is well known and understood that upon the completion of a water discharging operation that the sudden stopping of the flow by closing the valve creates a back surge in the water, the amplitude of which surge is dependent on the column or length of water in the pipe or tubing which has been placed in motion by the opening of the valve. In order to operate the valve at a greater speed, and maintain a predetermined discharge of water, means are provided associated with the valve for dampening or quickly eliminating the backward surge or resonance of the water upon the valve being closed. Also, there is provided, in association with the means for dampening the backward surge, a supply of water adjacent the valve opening which supply is immediately available to be passed through the valve by the means for dampening the water upon opening of the valve without having to wait for the entire column of water to start moving. With the present invention, valves may be tripped or opened three times a second to discharge a predetermined amount of water which is greater than twice the speeds heretofore thought attainable.

In Figures 2 to 4 is illustrated the preferred embodiment of the invention in the form of a resilient dome 43 sealably secured to the upper portion of the housing or support 34 and being formed of rubber, plastic, fiber or the like and having a thickness and resiliency of substantially the same as the inner tube of a tire. In operation, the dome 43 will initially be partially filled with water with an air pocket trapped at the top and upon opening and closing of the valve plunger 36 will have a breathing action which in a short interval of time discharges all the air from the dome with the outgoing water to enable the same to be completely filled with water and continue to operate filled with water with a breathing effect. In operation, when the valve plunger 36 is closed, the water surges upwardly into the dome 43 which causes the dome to expand to give a breathing effect to quickly dampen the back surge of water and quickly return the water to an inactive condition at which time the dome remains slightly expanded and is again ready for the next discharge operation. Upon the valve being opened, the dome immediately collapses to permit the supply of water therein to flow through the valve without having to wait for the entire column of water in the supply line to move.

In Figure 5 is illustrated a second embodiment of the invention wherein the support or housing 34' has been modified from the support or housing 34 in Figures 2 to 4 to increase the diameter at the upper portion of the housing to which is secured a resilient diaphragm 44 as by bolts 45. The diaphragm is formed of similar materials as the dome 43 in the first form of the invention. In operation, the backward surge of the water upon the closing the of the valve plunger 36 will cause the diaphragm 44 to move to the convex or outwardly bowed position shown in dotted lines thus dampening the movement of the water and return the same to an inert or inactive condition prior to the valve plunger 36 being again opened to insure that the amount of water discharged through the same and out the spout 40 is of the desired amount. The diaphragm remains slightly bowed outwardly until after the valve is again opened, at which time it moves inwardly to the collapsed or concave position shown in dotted lines to permit the water to pass through the valve without waiting for the entire column of waer in the supply line to move.

In Figure 6 is illustrated a third embodiment of the invention wherein a rigid dome or container 46 is provided threadably and sealably engaging the support or housing 34 which dome 46 is shown as being made of glass but may be formed of any other suitable rigid material. In operation, the dome or reservoir 46 will always have an air pocket maintained above the water therein, the compression of which air pocket by the backward surge of the water serves as the resilient means for dampening the backward surge of the water upon the closing of the valve plunger 36. Also, the compressed air serves to move the water supply in the container 46 through the valve upon the valve being opened without waiting for the entire column of water in the supply line to start to move.

In Figure 7 is illustrated the fourth embodiment of the invention wherein the housing or support 34" is formed with a cover for enclosing the valve plunger 36 and wherein a resilient bladder 50 is provided in the line between the valve 27 and the water supply or tank 25, which bladder is formed of a similar material and operates in a similar breathing effect manner as the resilient dome 43 in Figures 2 to 4.

In operation, the bladder 50 immediately collapses upon the valve plunger being actuated to quickly discharge water contained in the bladder through the valve without waiting for the entire column of water in the supply line to start to move. Prior to the completion of the discharging operation, the entire column of water in the supply line will have started to move and a small amount of this water will be discharged with the water contained by the bladder. It is thus apparent that the ready supply of water in the collapsible bladder completely eliminates the momentary delay or lag of the flow of water through the valve.

Upon the completion of a discharging operation, the bladder 50 will again fill with water and return to a slightly expanded condition due to the backward surge of the water and the increase in pressure on the bladder. The bladder will remain in this slightly expanded condition again ready to collapse for a discharging operation.

In Figure 8 is illustrated the fifth embodiment of the invention wherein at least a portion of a supply line or hose 26' connecting the water supply or tank 25 to the valve 27 is formed of a resilient material of rubber, plastic, fiber and the like and which hose 26' is in collapsed or flat condition in the absence of water being therein. This embodiment of the invention operates in a similar manner as the fourth embodiment to permit the water in the collapsible supply line 26' to quickly flow through the valve prior to the entire column of water starting to move.

Although all five embodiments of the means for dampening the backward surge of the water and for quickly permitting the water to be discharged through the valve are shown as being positioned substantially above the valve 27, it is to be distinctly understood that all forms of the invention with the exception of the third embodiment shown in Figure 6 may be positioned below or beside the valve 27 and still present an operable device. The only limitation for the four embodiments of the invention is that the supply of water acted upon by the dampening means be positioned adjacent the valve for quickly permitting the water to flow through the valve upon the same being opened.

Accordingly, it will be appreciated that since the water supply or tank 25 is positioned at a considerably higher elevation with respect to the valve 27, the valve 27 and all the embodiments of the invention for dampening the backward surge of water with the exception of the third embodiment in Figure 6 may be positioned upside-down or in the reverse position of that shown in the drawings and still present an operable device since the water will flow by gravity to the valve.

The third embodiment of the invention illustrated in Figure 6, since it depends upon the presence of an air pocket in a top portion of the water reservoir or dome 46 to act as a shock absorber for dampening the backward surge of water, must necessarily be positioned in a substantially upright position as shown in the drawings.

From the foregoing it will be readily understood that there have been provided a various number of embodiments for resiliently dampening or quickly eliminating the backward surge of water upon the plunger of the valve being closed which dampening devices quickly return the water to inert or non-active position and prevent the water from surging up the entire length of the supply line to the valve. Also, the dampening devices permit the supply of water immediately adjacent the valve to quickly move through the valve to thus insure that the desired predetermined amount of water will be discharged through the same. The elimination of the water surging backwardly up the entire length of the supply line upon a valve being closed thus presents a valve construction which may be tripped at widely spaced intervals for slow speed operation or at closely spaced intervals for high speed operation to discharge predetermined amounts of water from the valve.

For the purpose of disclosing this invention, the term "backward surge" is the direction of movement of the fluid away from the valve closing means and towards the resilient means for dampening the movement of the fluid.

Although a plunger type of valve has been shown to illustrate the invention, the invention is not restricted to this type of valve and the invention can readily be practiced with other types of valves such as the butterfly type, rubber ball type, piston type, etc.

Although the invention has been described as associated with a transplanter valve, it is to be distinctly understood that the application of the invention is not limited to this environmenal use since the invention is readily adaptable for any type of valve device wherein it is desired to open and close the same at closely spaced intervals to discharge a predetermined amount of fluid or liquid therefrom.

In the drawings and specification there has been set forth a preferred embodiment of the invention and several modified forms thereof and, although specific terms are employed, they are used in a generic and descriptive sense only and not for purposes of limitation, the scope of the invention being defined in the claims.

I claim:

1. In a valve construction having a housing with an open end, a valve in said housing, fluid inlet means communicatively connected to said housing, and means for intermittently opening and closing said valve; the combination therewith of resilient collapsible means closing said housing for resiliently dampening the backward surge of the fluid upon the valve being closed said resilient collapsible means containing a supply of fluid of sufficient quantity which upon said means collapsing is immediately available to be passed through the valve to insure a ready supply of fluid each time the valve is actuated without having to wait on the entire supply of fluid in the fluid inlet means to start moving.

2. A device according to claim 1 wherein said resilient collapsible means comprises a resilient collapsible dome secured to the upper edge of said housing.

3. A device according to claim 1 wherein said resilient collapsible means comprises a resilient diaphragm.

4. In a valve construction having a valve means for intermittently opening and closing said valve and a fluid supply source connected to the valve, the combination of resilient collapsible means positioned adjacent said valve and in the path of fluid surge created by the closing of said valve to dampen the surging movement of the fluid, said means containing a supply of fluid of sufficient quantity which upon said means collapsing is immediately available to be passed through the valve to insure a ready supply of fluid each time the valve is actuated without having to wait on the entire supply of fluid in the fluid supply source connected to the valve to start moving.

5. A device according to claim 4 wherein said resilient collapsible means comprises a resilient collapsible dome secured to said valve.

6. A device according to claim 4 wherein said resilient collapsible means comprises a resilient collapsible diaphragm secured to said valve.

7. A device according to claim 4 wherein said resilient collapsible means comprises a resilient collapsible hose connected to said valve.

8. A device according to claim 4 wherein said resilient collapsible means comprises a resilient collapsible bladder positioned in the path of travel of the fluid into the valve.

9. In a valve construction having a housing, a valve having a valve plunger positioned in said housing, means for intermittently actuating said plunger, a supply line extending from said housing and through which a liquid is permitted to flow into said housing and above said plunger, and means for directing the discharge of the liquid from said valve, the combination therewith a resilient means positioned adjacent said valve and in the path of liquid surge created by the closing of said valve plunger to dampen the surging movement of the liquid, said resilient means containing a supply of liquid of sufficient quantity which is immediately available to be passed through the valve by said resilient means to insure a ready supply of liquid each time the valve plunger is actuated without having to wait on the entire supply of liquid in the supply line to start moving.

10. In a valve construction having a housing for receiving a fluid therein, a supply line for supplying fluid to said housing, a valve in said housing, and means for intermittently discharging the fluid from the valve; the combination of expansible and collapsible means positioned adjacent said valve and in the path of fluid surge created by the closing of said valve to dampen the surging movement of the fluid, said expansible and collapsible means containing a supply of fluid of sufficient quantity which upon said means collapsing is immediately available to be passed through the valve to insure a ready supply of fluid each time the valve is actuated without having to wait on the entire supply of fluid in the supply line to start moving.

11. In a valve construction having a housing, a supply line connected to said housing for supplying a fluid thereto, a valve in said housing and means for intermittently discharging the fluid from the valve; the combination of collapsible means adjacent said housing and communicatively connected thereto and in the path of fluid surge created by the closing of said valve to dampen the surging movement of the fluid, said collapsible means containing a supply of fluid of sufficient quantity which upon said means collapsing is immediately available to be passed through the valve to insure a ready supply of fluid each time the valve is actuated without having to wait on the entire supply of fluid in the supply line to start moving.

(References on following page)

References Cited in the file of this patent

UNITED STATES PATENTS

| | | |
|---|---|---|
| 660,382 | Lambert | Oct. 23, 1900 |
| 1,169,250 | Fulton | Jan. 25, 1916 |
| 2,185,023 | Crane | Dec. 26, 1939 |
| 2,506,430 | Melvin | May 2, 1950 |
| 2,593,316 | Kraft | Apr. 15, 1952 |

FOREIGN PATENTS

| | | |
|---|---|---|
| 135,372 | France | Mar. 4, 1880 |